March 9, 1948.　　C. A. PUGH ET AL　　2,437,480
VALVE
Filed March 31, 1945　　2 Sheets-Sheet 1

Inventors:-
Cyril Alphonso Pugh
Douglas Gerhard Booth
Rudolph William Rough
By:- William E. P. Bayley
Attorney.

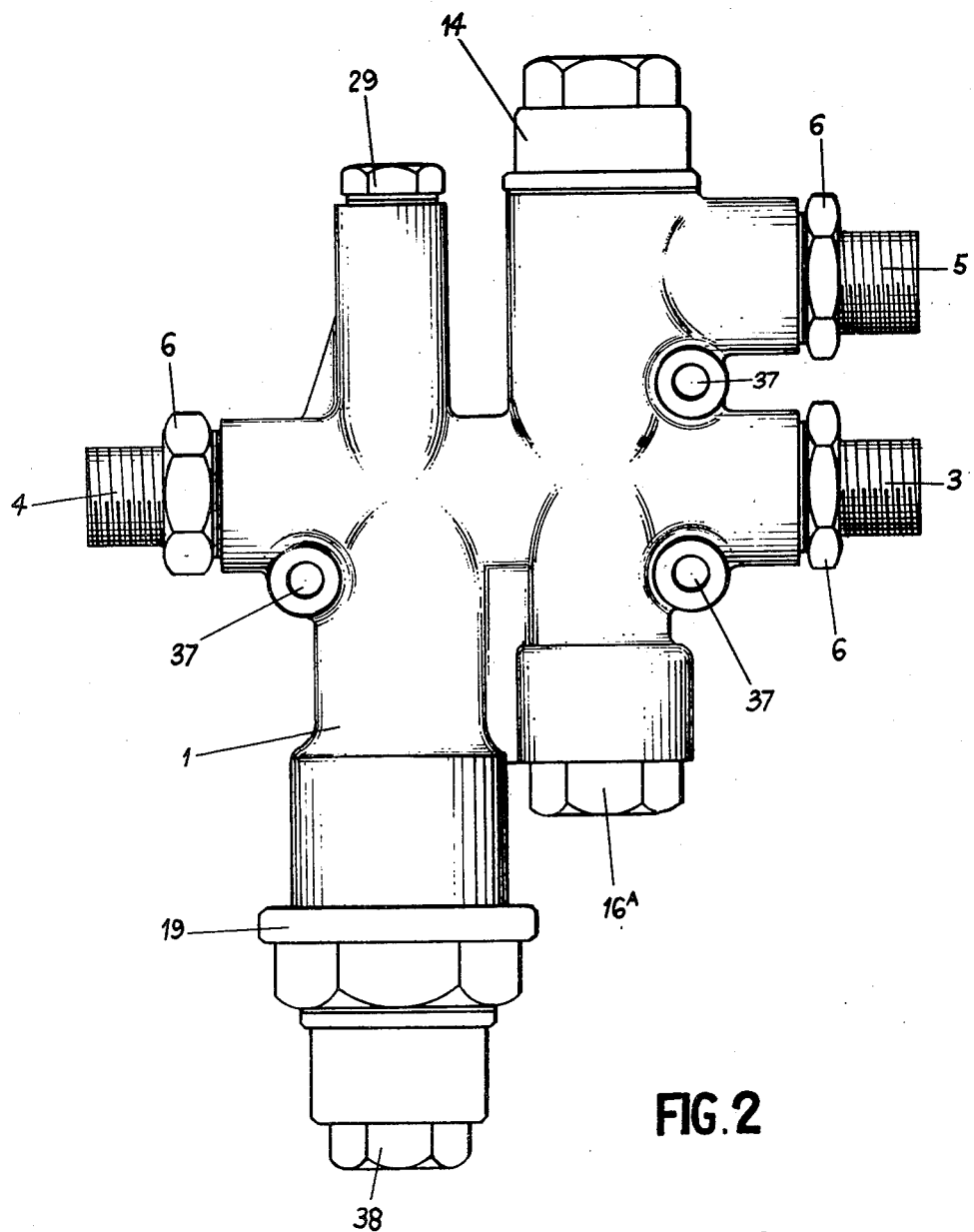

Patented Mar. 9, 1948

2,437,480

UNITED STATES PATENT OFFICE 2,437,480

VALVE

Cyril Alphonso Pugh and Douglas Gerhard Booth, Ilford, and Rudolph William Rough, Romford, England, assignors to The Plessey Company Limited, Ilford, England, a British company Application March 31, 1945, Serial No. 585,896
In Great Britain December 18, 1944

6 Claims. (Cl. 137—153)

This invention relates to a valve which has for one of its objects to provide a simple and efficient cut-out valve for maintaining any pressure within pre-set limits in a hydraulic service or supply without the necessity of the supply pump working continuously at full pressure, and it is particularly useful, but not exclusively, where intermittent demands are made of the service or supply, for when a demand is made, the full pressure and supply from the pump is instantly available.

The invention will now be described by way of example with reference to the accompanying drawing, in which:

Fig. 2 is an elevation of Fig. 1.

Figure 1:
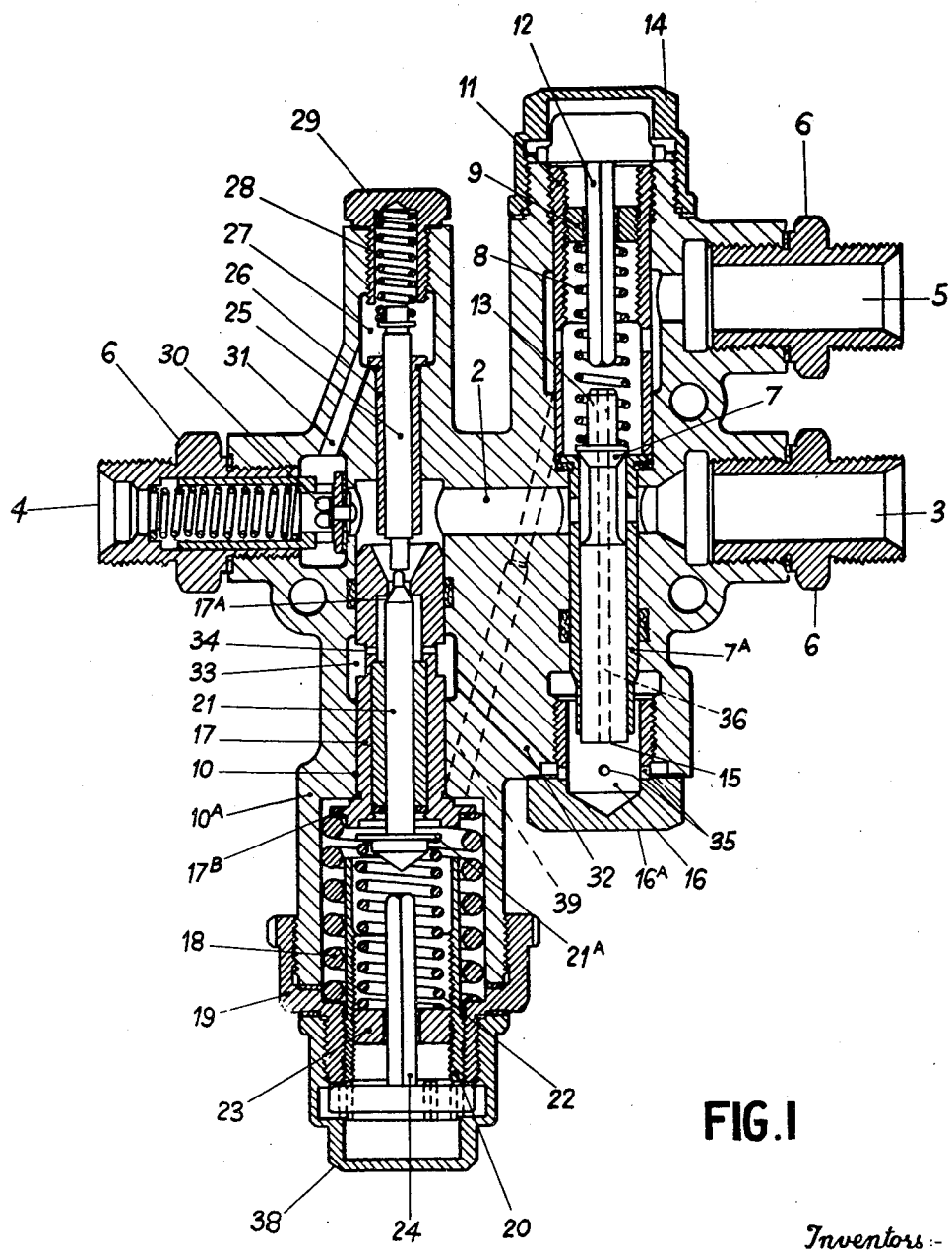
Fig. 1 is a sectional elevation of the valve body.

According to this invention the valve comprises, a valve body having a fluid pressure chamber with an inlet and outlet for coupling to a supply and delivery line respectively, a by-pass containing a main spring loaded valve which communicates with the pressure chamber and a pilot valve control means adapted to be subjected to the supply and delivery pressures for controlling a hydraulic loading of said main valve in opposition to its spring loading, the arrangement being such, that whenever the pressure in the chamber rises above a predetermined value, said hydraulic loading increases and forces open the main valve causing fluid entering the inlet to flow through the by-pass until a lower pre-arranged pressure exists in the delivery line; when the pilot valve control means returns to its normal position thereby removing the hydraulic load from said main valve, which in turn allows the by-pass to close thus making the full delivery from the pump available in the delivery line.

A non-return valve is either fitted in the delivery line, or in the outlet of the valve, and a conduit is provided for connecting the delivery line with the pilot valve control means.

An advantage of the invention is that the valve may be adjusted to control the maximum pressure, the pressure range over which the pressure may be allowed to vary and the pressure at which the supply pump by-passes within very close limits.

A feature of the invention is that, the pilot valve control means may consist of a spring loaded needle valve which actuates in conjunction with a spring loaded movable seating and a lightly loaded piston co-axially arranged with respect to the needle valve. The arrangement is so designed that the hydraulic pressure in the chamber acts upon the needle valve and its movable seating and on the piston is normally in hydraulic balance to the pressures within the chamber and that in the delivery line. The load on the valve seating is such that the needle valve seating, therefore, moves a pre-arranged distance before its valve operates when the pressure increases in the pressure chamber as hereinafter set forth.

Preferably, adjustable means are provided for varying the loading on the pilot valve, movable seating and main valve, and for controlling the travel of the movable seating.

Another feature of the invention is that the head or face of the needle valve may be of smaller area than its stem to prevent same fluctuating on or near its seat, so that once the valve commences to open the effective area is increased and it moves immediately and rapidly away from its seat.

Referring to the drawings:

A valve body 1 contains a pressure chamber 2 which communicates with an inlet conduit 3, and outlet conduit 4 and a by-pass conduit 5. Each of these said conduits 3, 4 and 5 are fitted with a union 6 for coupling the respective parts to the supply, delivery and by-pass lines of a hydraulic system.

A valve 7 fitted into the by-pass chamber 5a is normally held on its seating by a spring 8 which abuts against the outer face of the valve 7 and a screw collar 9 screwed into a sleeve 11 fixed in the by-pass 5, the purpose of which is to secure in position the valve sleeve 7a in which valve 7 operates. The tension of spring 8 can be varied within certain limits by turning the screw collar 9 in a clockwise or anti-clockwise direction. A screw cap 14 is screwed on to the valve body 1. The opposite end 15 of the stem of valve 7 terminates in a small hydraulic chamber 16 which is closed by a removable plug 15a.

Leading from the pressure chamber 2 is a spring loaded valve housed in a bearing 10, which contain a movable sleeve 17, one end of which is provided with an internal valve seating 17a, and the other end is formed with an enlarged annular flange 17b. Said sleeve 17 is loaded by a comparatively strong spring 18 inserted into a chamber 10a and interposed between the annular flange 17b of sleeve 17 and a nut 19 screwed onto the valve body 1. The actual amount of movement of said movable sleeve 17 and valve seating 17a is pre-determined and limited by means of an adjustable sleeve 20 screwed into one end of nut 19 in such a way that, its inner end forms a stop by engaging with the outer face of the annular flange 17b when the movable sleeve 17 moves a pre-set distance under the influence of the hydraulic pressure in chamber 2 acting on the end containing the valve seat.

A needle valve 21 is slidably mounted in the sleeve 17, the stem of said valve 21 is of larger area than the seating portion for the purpose herein set forth. Said valve 21 is loaded by a spring 22 inserted into sleeve 20 engaging with the enlarged end 21a of the needle valve 21, and a screw collar 23 which is adjustable in the screwed sleeve 20 by means of a key 24. The load exerted by spring 18 is such that the sleeve 17 will be depressed against the end of sleeve 20 before the pressure in chamber 2 is sufficient to move needle valve 21 away from its seat 17a in sleeve 17. A cap 38 is screwed on to the end of nut 19 thus enclosing the screwed sleeve 20 and key 24.

A piston rod 25 slidably mounted in a bearing 26 is coaxially arranged and engages with the end of the needle valve 21 in chamber 2. The other end of the piston rod 25 terminates in a small chamber 27 and is lightly loaded by a spring 28, enclosed by a threaded cap 29 screwed into the valve body 1.

A spring loaded non-return valve 30 is fitted in the outlet conduit 4, and another conduit 31 provides a communication between this said outlet conduit 4 and chamber 27, so that the hydraulic pressure existing in the delivery line loads the end of the piston rod 25 within said chamber 27.

A conduit 32 in the valve body 1 terminates at one end into an annular chamber 33 which is conterminous with a plurality of ports 34 in the movable sleeve 17, and at the other end with a series of apertures 35 in chamber 16, whereby hydraulic fluid can flow to this chamber 16 and actuate valve 7 when the needle valve 21 is opened.

The valve 7 is provided with a conduit 36 which constitutes an orifice which restricts the flow from chamber 35 to chamber 5a thereby allowing bleeding of the chamber 16 to take place in order to allow valve 7 to close on its seating when the needle valve 21 is closed.

Fixing holes 37 are provided in the valve body 1 for receiving bolts or the like for holding the valve body 1 in a rigid position.

A conduit 39 provides a drainage from the chamber 19a to the by-pass 5.

Now assuming a pump supply is connected to the valve inlet port 3 and that the outlet port 4 is connected to a hydraulic circuit which has a capacity and a mean demand not exceeding the pump capacity. The pressure in chamber 2 will rise and, acting upon the face of the movable sleeve 17, will overcome the load of spring 18 and cause the movable sleeve 17 to move back against the end of the adjustable sleeve 20, taking with it needle valve 21 and so increasing the load exerted by spring 22 upon the needle valve 21.

Piston rod 25 which is in hydraulic balance in respect of the pressure in chamber 2 while valve 30 is open and is held in contact with the end of needle valve 21 by means of the light spring 28, will move with the needle valve 21. The pressure in chamber 2 continues to rise until it is sufficient when acting upon the end area of needle valve 21 exposed to chamber 2, to overcome the load due to spring 22. This causes the head of needle valve 21 to move away from its seat 17a in sleeve 17, and to prevent the needle valve 21 fluctuating on or near its seat, the stem is made of a larger area as herein before set forth. The opening of needle valve 21 then permits the pump to deliver fluid into chamber 16 via ports 34, conduit 32 and apertures 35 so causing the fluid pressure in chamber 16 to increase.

This fluid pressure acting against the end of valve 7 within the chamber increases until it overcomes the load due to the spring 8 thus causing the valve 7 to move away from its seat and allow fluid to by-pass via conduit 5. The movement of this valve continues until a lower pressure is obtained in the chamber 2, conduit 32 and chamber 16 which, acting upon the end 15 of valve 7, is sufficient to balance the load of spring 8 and so maintain a by-pass pressure within the chamber 2 at a pressure predetermined by the adjustment of spring 8.

When the pressure in chamber 2 falls to this lower pressure, non-return valve 30 closes and so the service line pressure is maintained. The movable sleeve 17 under the influence of spring 18 returns to its former position but the needle valve 21 remains at the position to which it was carried by the movable sleeve 17 and the movement imparted to it by the previously existing high pressure in chamber 2 acting upon the end of it. It is held in this position by piston rod 25, one end of which having an equivalent area to the area of valve seat 17a extends into and is subjected to the pressure in chamber 27 which is at the same pressure as exists in the delivery line, to which it is connected by conduit 31.

Now before the needle valve 21 can assume its original position by closing on to its seat 17a to allow the pump to again deliver into the delivery line it must move forward the same amount as the movable sleeve 17 has moved and to enable it to do this the service pressure must fall so that the force tending to keep it open, which is the service pressure acting on the end area of piston rod 25 within the chamber 27, becomes less than to the force tending to close it, that is, the force exerted by the spring 22 in its extended position.

The bleeding of chamber 16 allows the valve 7 to close as herein set forth, and prevent valve 7 opening due to any leakages that may take place past the movable sleeve 17, needle valve 21 or valve stem of valve 7 when the needle valve 21 is in its closed position.

It will be apparent from the foregoing description that a very accurate and delicate control to the cut-out and cut-in pressures may be obtained by adjustment of the adjustable sleeve 20 by adjustment of the spring 22 by the adjustable screw collar 23 and threaded member 24.

Only comparatively light springs are required to control very high pressures and flows at which the valve may be operated as the valve 7, which serves to by-pass a large flow at low pressure and is necessarily large, is hydraulically operated and the needle pilot valve 21 which controls the hydraulic loading of the valve 7 need only be very small to handle the very small flow needed to hydraulically load the valve 7. Therefore, only very light springs are required to effect control by the valve of very high pressures.

We claim:

1. A valve comprising in combination, a valve body containing a fluid pressure chamber with an inlet and outlet port for coupling to a supply and delivery line respectively and a by-pass communicating with the pressure chamber, a main spring loaded valve fitted in the by-pass actuated by a hydraulic load in said valve body and provided with means for bleeding the hydraulic load and a pilot valve control means in which a pilot valve co-operates with a movable seating and both said pilot valve and movable seating are independently spring loaded the movable seating being subjected to the supply pressure and the pilot valve, indirectly to the delivery pressure for controlling the hydraulic loading of said valve in opposition to its spring loading, the arrangement being such that, whenever, the pressure in the chamber rises above a pre-set value, said valve control means is operated, causing the hydraulic load of said main valve to increase and, therefore, open and allow fluid entering the inlet to flow through the by-pass until a lower predetermined pressure is obtained in the delivery line when said pilot valve control means returns to its normal position and thereby reduces the hydraulic load on said main valve.

2. A valve comprising in combination a valve body containing a fluid pressure chamber with an inlet and outlet port for coupling to a supply and delivery line respectively, a conduit leading from the outlet for connecting the pressure chamber to the delivery line, and a by-pass communicating with the pressure chamber, a non-return valve provided in said valve body between the pressure chamber and conduit leading from the outlet to the pressure chamber, a main spring loaded valve fitted in the by-pass actuated by a hydraulic load in said valve body and provided with means for bleeding the hydraulic load and a pilot valve control means in which a pilot valve co-operates with a movable seating and both said pilot valve and movable seating are independently spring loaded, the movable seating being subjected to the supply pressure and the pilot valve, indirectly to the delivery pressure for controlling the hydraulic loading of said valve in opposition to its spring loading, the arrangement being such that, whenever the pressure in the chamber rises above a pre-set value, said valve control means is operated, causing the hydraulic load of said main valve to increase, and, therefore, open and allow fluid entering the inlet to flow through the by-pass until a lower predetermined pressure is obtained in the delivery line when said pilot valve control means returns to its normal position and thereby reduces the hydraulic load on said main valve.

3. A valve comprising in combination a valve body containing a fluid pressure chamber with inlet and outlet ports, a by-pass between the pressure chamber and outlet port and another by-pass leading from the pressure chamber to an exhaust port, a non-return valve fitted between the pressure chamber and the outlet port, a main spring loaded valve fitted in the by-pass leading from the pressure chamber to exhaust being actuated by the hydraulic load in the pressure chamber, a movable spring loaded sleeve with an internal valve seating mounted in a bearing communicating with the pressure chamber in said valve body, a spring loaded pilot valve co-operating with the internal seating in said sleeve, a spring loaded piston operatively connected to said pilot valve which is actuated by the pressures in the chamber and by-pass from the outlet port in the valve body, the arrangement being such that, whenever the pressure in the chamber rises above a pre-set value, said sleeve is moved and as the pressure continues to increase the pilot valve is lifted off its seating, when the main spring loaded valve is hydraulically loaded and moved off its seating allowing fluid entering the inlet to flow through the by-pass to exhaust and the movable sleeve to return to its normal position until a lower predetermined pressure is obtained in the outlet when the pilot valve closes onto its seat thereby reducing the hydraulic load in said main spring valve and bleeding of the hydraulic load allows same to close.

4. A valve according to claim 3 including means for varying the compression of the springs fitted to the respective valves.

5. A valve comprising in combination a valve body containing a fluid pressure chamber with inlet and outlet ports, a by-pass between the pressure chamber and outlet port and another by-pass leading from the pressure chamber to an exhaust port, a non-return valve fitted in the outlet port behind the by-pass in said valve body, a main spring loaded valve fitted in the by-pass leading from the pressure chamber to exhaust actuated by the hydraulic load in the pressure chamber, a movable spring loaded sleeve with an internal valve seating mounted in a bearing communicating with the pressure chamber in said valve body, a spring loaded pilot valve in which the stem is of larger diameter than its valve face co-operating with the internal seating in said sleeve, a spring loaded piston operatively connected to said pilot valve which is actuated by the pressures in the chamber and by-pass from the outlet port in the valve body, the arrangement being such that, whenever the pressure in the chamber rises above a pre-set value, said sleeve is moved and as the pressure continues to increase the pilot valve is lifted off its seating, when the main spring loaded valve is hydraulically loaded and moved off its seating allowing fluid entering the inlet to flow through the by-pass to exhaust and the movable sleeve to return to its normal position until a lower predetermined pressure is obtained when the pilot valve closes thereby reducing the hydraulic load in said main spring valve and bleeding of the hydraulic load allows same to close.

6. A valve according to claim 3 including adjustable means for varying the stroke of the movable sleeve.

CYRIL ALPHONSO PUGH.
DOUGLAS GERHARD BOOTH.
RUDOLPH WILLIAM ROUGH.

REFERENCES CITED

The following references are of record in the file of this patent:

UNITED STATES PATENTS

| Number | Name | Date |
| --- | --- | --- |
| 2,375,411 | Grant | May 8, 1945 |
| 2,397,117 | Ashton | Mar. 26, 1946 |